US009971368B2

United States Patent
Mittal et al.

(10) Patent No.: US 9,971,368 B2
(45) Date of Patent: May 15, 2018

(54) ACCURATE HOTSPOT DETECTION THROUGH TEMPERATURE SENSORS

(71) Applicant: QUALCOMM Incorporated, San Diego, CA (US)

(72) Inventors: Rajat Mittal, San Diego, CA (US); Mehdi Saeidi, San Diego, CA (US); Arpit Mittal, San Diego, CA (US); Emil Rahim, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 410 days.

(21) Appl. No.: 14/963,790

(22) Filed: Dec. 9, 2015

(65) Prior Publication Data

US 2017/0168514 A1    Jun. 15, 2017

(51) Int. Cl.
*G05F 1/46* (2006.01)
*G01K 13/00* (2006.01)

(52) U.S. Cl.
CPC ............ *G05F 1/463* (2013.01); *G01K 13/00* (2013.01)

(58) Field of Classification Search
USPC .......................................................... 307/31
See application file for complete search history.

(56) References Cited

U.S. PATENT DOCUMENTS

| | | | |
|---|---|---|---|
| 7,520,669 | B2 | 4/2009 | Yazawa et al. |
| 8,891,327 | B2 | 11/2014 | Kim |
| 2006/0013281 | A1 | 1/2006 | Sri-Jayantha et al. |
| 2007/0150225 | A1 | 6/2007 | Boerstler et al. |
| 2007/0213882 | A1 | 9/2007 | Inukai et al. |
| 2014/0192835 | A1 | 7/2014 | Caroff et al. |

OTHER PUBLICATIONS

Zhang Y., et al., "Accurate Temperature Estimation using Noisy Thermal Sensors," 46th ACM/IEEE Design Automation Conference (DAC), 2009, pp. 472-477.
International Search Report and Written Opinion—PCT/US2016/063125—ISA/EPO—Mar. 1, 2017.

*Primary Examiner* — Rexford Barnie
*Assistant Examiner* — Dru Parries
(74) *Attorney, Agent, or Firm* — Loza & Loza LLP

(57) ABSTRACT

In one embodiment, a temperature management system comprises a plurality of temperature sensors on a chip, and a temperature manager. The temperature manager is configured to receive a plurality of temperature readings from the temperature sensors, to determine a plurality of power values based on the temperature readings, to determine a plurality of temperature values based on the determined power values, the determined temperature values corresponding to a plurality of different locations on the chip, and to estimate a temperature of a hotspot on the chip based on the determined temperature values.

24 Claims, 7 Drawing Sheets

… (1)

ACCURATE HOTSPOT DETECTION THROUGH TEMPERATURE SENSORS

BACKGROUND

Field

Aspects of the present disclosure relate generally to temperature sensing, and more particularly, to estimating a hotspot temperature.

Background

Due to increases in chip integration and operating frequencies, power densities in chips have dramatically increased, resulting in higher chip temperatures. As a result, temperature management is playing an increasingly important role in protecting chips from damage due to overheating.

In this regard, temperature sensors may be integrated on a chip to monitor temperature at various locations on the chip. Temperature readings from the temperature sensors may be input to a temperature manager that manages blocks (e.g., central processing units (CPUs), graphics processor unit (GPU), modem etc.) on the chip based on the temperature readings to prevent excessive power leakage and/or thermal runaway. Thermal runaway occurs when increases in temperature cause increases in leakage power, which, in turn, cause further increases in temperature. This positive feedback can cause the temperature of the chip to rapidly rise, potentially damaging the chip.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to a first aspect, a temperature management system is provided. The temperature management system comprises a plurality of temperature sensors on a chip, and a temperature manager. The temperature manager is configured to receive a plurality of temperature readings from the temperature sensors, to determine a plurality of power values based on the temperature readings, to determine a plurality of temperature values based on the determined power values, the determined temperature values corresponding to a plurality of different locations on the chip, and to estimate a temperature of a hotspot on the chip based on the determined temperature values.

A second aspect relates to a method for managing temperature. The method comprises receiving temperature readings from a plurality of temperature sensors on a chip, determining a plurality of power values based on the temperature readings, and determining a plurality of temperature values based on the determined power values, the determined temperature values corresponding to a plurality of different locations on the chip. The method also comprises estimating a temperature of a hotspot on the chip based on the determined temperature values.

A third aspect relates to an apparatus for managing temperature. The apparatus comprises means for receiving temperature readings from a plurality of temperature sensors on a chip, means for determining a plurality of power values based on the temperature readings, and means for determining a plurality of temperature values based on the determined power values, the determined temperature values corresponding to a plurality of different locations on the chip. The apparatus also comprises means for estimating a temperature of a hotspot on the chip based on the determined temperature values.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
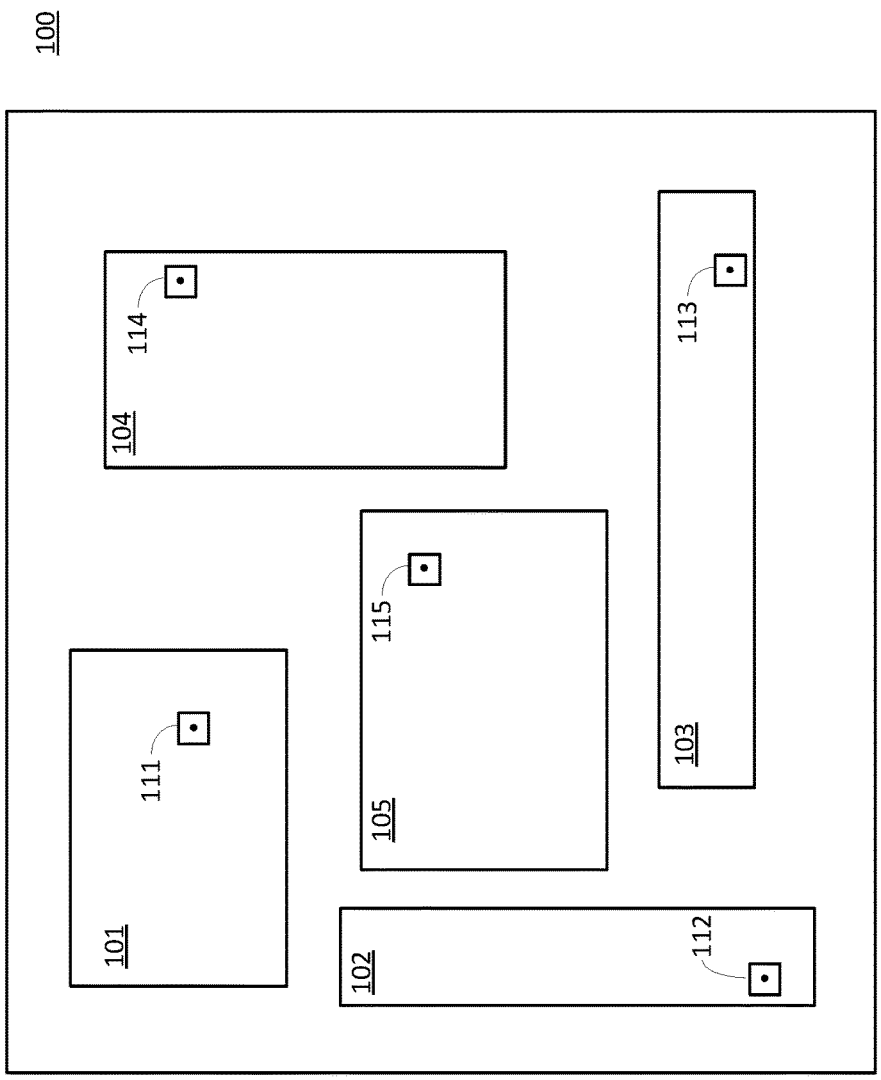
FIG. 1 shows an example of a chip including blocks and temperature sensors according to certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Temperature sensors may be integrated on a chip to monitor temperature at various locations on the chip. Temperature readings from the temperature sensors may be input to a temperature manager that manages blocks (e.g., central processing units (CPUs), graphics processor unit (GPU), modem etc.) on the chip based on the temperature readings to prevent excessive power leakage and/or thermal runaway. For example, when a temperature reading reaches a temperature threshold, the temperature manager may take steps to reduce the temperature such as throttling back (reducing) the operating frequency of a processor (e.g., CPU) on the chip and/or reducing the supply voltage of the processor. Reducing the operating frequency, the supply voltage, or both reduces the temperature by reducing the dynamic power dissipation of the processor, which is approximately proportional to the operating frequency and the square of the supply voltage.

In a conventional approach, temperature sensors are placed as close as possible to one or more hotspots on a chip in order to measure the temperatures of the one or more hotspots. As used herein, a "hotspot" is a hottest spot in a given area of the chip at a given time. The area may be the area of a block (e.g., CPU, GPU, modem, etc.) on the chip, the area of a combination of blocks on the chip, the area of the entire chip, etc.

A challenge with measuring the temperature of a hotspot is that the hotspot may move on the chip over time (e.g., depending on use case), making it difficult to place a temperature sensor at the hotspot, and therefore obtain an accurate temperature measurement of the hotspot. This problem is made worse by the limited number of temperature sensors on the chip. Another challenge is that a hotspot typically occurs in a very active and densely populated region of the chip. Therefore, placing a temperature sensor near the hotspot may interference with the design of the chip and negatively impact chip performance. For this reason, the temperature sensor may be placed away from the hotspot. As a result, temperature sensors on the chip often miss a hotspot on the chip.

Because the temperature sensors often miss a hotspot, a margin needs to be budgeted into each temperature reading to account for the worst case difference between the temperature reading and the temperature of a hotspot. For example, if the temperature manager is configured to initiate temperature mitigation when the hotspot temperature reaches 90 degrees Celsius, the temperature manager may initiate temperature mitigation when a temperature reading from a temperature sensor reaches 75 degrees Celsius. In this example, a 15 degree margin is budgeted into the temperature value. A problem with this approach is that the difference between the temperature reading and the hotspot temperature may be less than the worst case difference in most cases. As a result, the temperature manager may initiate temperature mitigation while the hotspot temperature is still below 90 degrees Celsius. Initiating temperature mitigation too soon unnecessarily reduces chip performance. This is because temperature mitigation typically involves reducing the operating frequency of a processor on the chip, which lowers the performance (e.g., processing speed) of the processor.

Accordingly, there is a need to accurately estimate a hotspot temperature using a limited number of temperature sensors.

Embodiments of the present disclosure enable a temperature manager to accurately determine temperature values at many different locations on a chip using a relatively small number of temperature sensors, and therefore determine the temperature of a hotspot with greater accuracy, as discussed further below.

Figure 2:
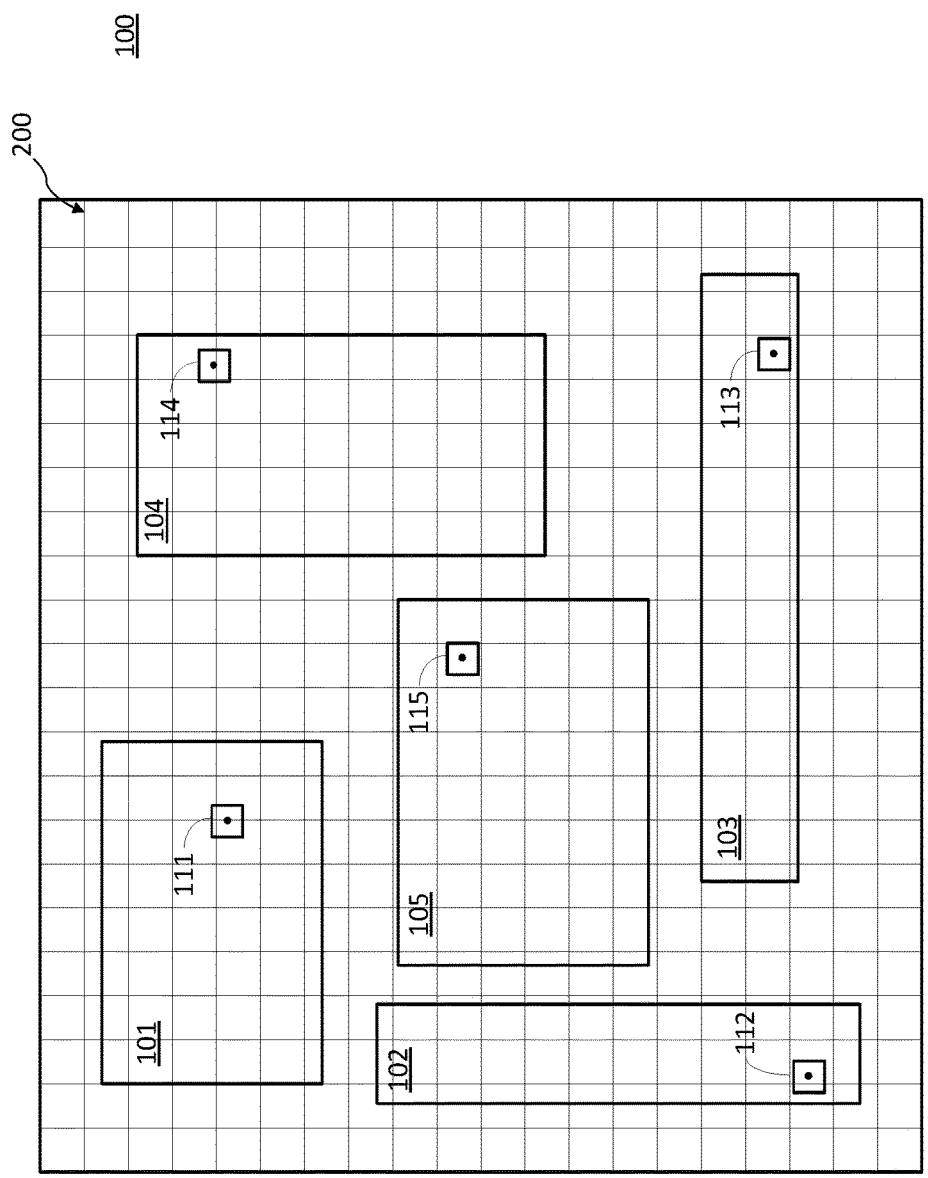
FIG. 2 shows the chip of FIG. 1 with an exemplary grid overlaid on the chip according certain aspects of the present disclosure.

Aspects of the present disclosure will now be discussed in greater detail with reference to FIGS. 1 and 2. FIG. 1 shows an example of a chip 100 comprising five blocks 101-105 and five temperature sensors 111-115. The blocks may include one or more central processing units (CPUs), a graphics processing unit (GPU), a digital signal processor (DSP), an image signal processor (ISP), a modem, etc. It is to be appreciated that the number of blocks and block shapes shown in FIG. 1 are exemplary only. The chip may have any number of blocks and block shapes.

Each of the temperature sensors 111-115 may be located within a respective one of the blocks 101-105, as shown in FIG. 1. The location of each temperature sensor 111-115 is represented by a black dot at the sensor. It is to be appreciated that the temperature sensors 111-115 in FIG. 1 are not drawn to scale with respect to the blocks. In this example, the temperatures at the temperature sensors 111-115 may be related to the powers at the blocks 101-105 as follows:

$$\begin{bmatrix} T_{s_1} \\ T_{s_2} \\ T_{s_3} \\ T_{s_4} \\ T_{s_5} \end{bmatrix} = \begin{bmatrix} \Psi_{s_{11}} & \Psi_{s_{12}} & \Psi_{s_{13}} & \Psi_{s_{14}} & \Psi_{s_{15}} \\ \Psi_{s_{21}} & \Psi_{s_{22}} & \Psi_{s_{23}} & \Psi_{s_{24}} & \Psi_{s_{25}} \\ \Psi_{s_{31}} & \Psi_{s_{32}} & \Psi_{s_{33}} & \Psi_{s_{34}} & \Psi_{s_{35}} \\ \Psi_{s_{41}} & \Psi_{s_{42}} & \Psi_{s_{43}} & \Psi_{s_{44}} & \Psi_{s_{45}} \\ \Psi_{s_{51}} & \Psi_{s_{52}} & \Psi_{s_{53}} & \Psi_{s_{54}} & \Psi_{s_{55}} \end{bmatrix} \begin{bmatrix} P_1 \\ P_2 \\ P_3 \\ P_4 \\ P_5 \end{bmatrix} + T_{ref} \quad \text{Eq. (1)}$$

where the left-most matrix is a temperature matrix comprising temperatures at the temperature sensors 111-115, the right-most matrix is a power matrix comprising powers at the blocks 101-105, the middle matrix is a first influence coefficient matrix, and $T_{ref}$ is a reference temperature. In the temperature matrix, $Ts_1$ is the temperature at the first temperature sensor 111, $Ts_2$ is the temperature at the second temperature sensor 112, and so forth. In the power matrix, $P_1$ is the power at the first block 101, $P_2$ is the power at the second block 102, and so forth. The power at each block may include dynamic power dissipation and/or power leakage at the block. The reference temperature $T_{ref}$ is discussed further below.

Equation (1) may be rewritten as follows:

$$\begin{bmatrix} \Delta T_{s_1} \\ \Delta T_{s_2} \\ \Delta T_{s_3} \\ \Delta T_{s_4} \\ \Delta T_{s_5} \end{bmatrix} = \begin{bmatrix} \Psi_{s_{11}} & \Psi_{s_{12}} & \Psi_{s_{13}} & \Psi_{s_{14}} & \Psi_{s_{15}} \\ \Psi_{s_{21}} & \Psi_{s_{22}} & \Psi_{s_{23}} & \Psi_{s_{24}} & \Psi_{s_{25}} \\ \Psi_{s_{31}} & \Psi_{s_{32}} & \Psi_{s_{33}} & \Psi_{s_{34}} & \Psi_{s_{35}} \\ \Psi_{s_{41}} & \Psi_{s_{42}} & \Psi_{s_{43}} & \Psi_{s_{44}} & \Psi_{s_{45}} \\ \Psi_{s_{51}} & \Psi_{s_{52}} & \Psi_{s_{53}} & \Psi_{s_{54}} & \Psi_{s_{55}} \end{bmatrix} \begin{bmatrix} P_1 \\ P_2 \\ P_3 \\ P_4 \\ P_5 \end{bmatrix} \quad \text{Eq. (2)}$$

where $\Delta Ts_1$ is the difference between the temperature at the first sensor 111 and the reference temperature $T_{ref}$, $\Delta Ts_2$ is the difference between the temperature at the second sensor 112 and the reference temperature $T_{ref}$, and so forth. As shown in equation (2), each coefficient in the first influence coefficient matrix relates the power at one of the blocks to a change in temperature at one of the temperature sensors in response to the power at the block, where the change in temperature is with respect to the reference temperature $T_{ref}$. In equation (2), the first index of each coefficient refers to the respective temperature sensor and the second index of each coefficient refers to the respective block. For example, coefficient $\Psi_{s_{12}}$ relates the power at the second block 102 to the change in temperature at the first sensor 111 in response to the power at the second block 102, coefficient $\Psi_{s_{21}}$ relates the power at the first block 101 to the change in temperature at the second sensor 112 in response to the power at the first block 101, and so forth. Thus, each coefficient in the first influence coefficient matrix relates the power at the respective block to the change in temperature at the respective temperature sensor in response to the power at the respective block, where the change in temperature is with respect to the reference temperature $T_{ref}$.

The reference temperature $T_{ref}$ may be the temperature of a package on which the chip is mounted, an ambient temperature, etc. For the example in which the reference temperature $T_{ref}$ is the temperature of the package, the reference temperature $T_{ref}$ may be measured by an external temperature sensor (off-chip temperature sensor) on the package. In another example, the reference temperature $T_{ref}$ may be the temperature measured at one of the temperature sensors 111-115 when the corresponding block is first powered on.

The coefficients in the first influence coefficient matrix may be determined by performing thermal simulations of the chip using a chip thermal simulation tool running on a computer or through controlled experimentation on the chip. For example, the coefficients in the first column of the first influence coefficient matrix may be determined by setting the power of the first block 101 to a predetermined power value (e.g., one watt) with the powers of the other blocks 102-105 set to zero, and recording the resulting temperature changes at the locations of the sensors. In this example, coefficient $\Psi_{11}$ is determined based on the predetermined power value of the first block 101 and the resulting temperature change at the location of the first temperature sensor 111, coefficient $\Psi_{21}$ is determined based on the predetermined power value of the first block 101 and the resulting temperature change at the location of the second temperature sensor 112, and so forth. Similarly, the coefficients in the second column of the first influence coefficient matrix may be determined by setting the power of the second block 102 to a predetermined power value with the powers of the other blocks 101 and 103-105 set to zero, and recording the resulting temperature changes at the locations of the sensors. In this example, coefficient $\Psi_{12}$ is determined based on the predetermined power value of the second block 102 and the resulting temperature change at the location of the first temperature sensor 111, coefficient $\Psi_{22}$ is determined based on the predetermined power value of the second block 102 and the resulting temperature change at the location of the second temperature sensor 112, and so forth. Thus, each column in the first influence coefficient matrix may be generated by setting the power of the respective block to a predetermined power value with the other blocks powered off, and determining the coefficients in the column based on the predetermined power value of the respective block and the resulting temperature changes at the sensor locations. The above steps may be performed through a thermal simulation of the chip or controlled experimentation on the chip.

In certain aspects, the influence coefficients of the first influence coefficient matrix may be determined by powering the blocks to get a set of linearly independent power vectors. The temperatures at the sensor locations can be measured for the different power vectors to obtain a set of algebraic equations that can be solved for a unique solution. The above steps can be performed through a thermal simulation of the chip or controlled experimentation on the chip.

Although aspects of the present disclosure are described above using the example of five blocks 101-105 and five temperature sensors 111-115, it is to be appreciated that aspects of the present disclosure are not limited to this example. In general, the first influence coefficient matrix may relate the powers at an arbitrary number of blocks to temperature changes at an arbitrary number of temperature sensors. In this regard, equation (2) may be written for an arbitrary number of blocks and an arbitrary number of temperature sensors as follows:

$$\begin{bmatrix} \Delta T_{s_1} \\ \vdots \\ \Delta T_{s_M} \end{bmatrix} = \begin{bmatrix} \Psi_{s11} & \cdots & \Psi_{s1N} \\ \vdots & \ddots & \vdots \\ \Psi_{sM1} & \cdots & \Psi_{sMN} \end{bmatrix} \begin{bmatrix} P_1 \\ \vdots \\ P_N \end{bmatrix} \quad \text{Eq. (3)}$$

where M is the number of temperature sensors and N is the number of blocks (e.g., one or more CPUs, GPU, modem, etc.). For the example in which each block has an associated temperature sensor, the number of temperature sensors and the number of blocks are equal, and the first influence coefficient matrix is a square matrix. Although each temperature sensor 111-115 in the example in FIG. 1 is located within one of the blocks 101-105, it is to be appreciated that the present disclosure is not limited to this example. For instance, one or more of the sensors may be located on the chip outside the blocks.

Equation (3) may be denoted as follows for simplicity:

$$[\Delta T_{sen}] = [\Psi_{sen}][P_{blocks}] \quad \text{Eq. (4)}$$

where $[\Delta T_{sen}]$ denotes the temperature matrix, $[\Psi_{sen}]$ denotes the first influence coefficient matrix, and $[P_{blocks}]$ denotes the power matrix. Equation (4) may be rewritten as follows:

$$[P_{blocks}] = [\Psi_{sen}]^{-1} [\Delta T_{sen}] \quad \text{Eq. (5)}$$

where $[\Psi_{sen}]^{-1}$ is the inverse of the first influence coefficient matrix. In this example, the first influence coefficient matrix $[\Psi P_{sen}]$ is a square matrix so that the first influence coefficient matrix can be inverted in equation (5). Equation (5) allows the temperature manager to back calculate power values for the blocks 101-105 using temperature readings from the temperature sensors 111-115. This is because the inverse of the first influence coefficient matrix is known and the differences between the temperatures at the sensor locations and the reference temperature $T_{ref}$ can be determined from the temperature readings (e.g., by taking the differences between the temperatures indicated by the temperature readings and the reference temperature $T_{ref}$). The reference temperature may be determined from an external temperature sensor on the package, or other technique, as discussed above. As discussed further below, the calculated power values for the blocks 101-105 enable the temperature manager to determine temperatures at locations on the chip other than the locations of the temperature sensors 111-115 using a second influence coefficient matrix.

The second influence coefficient matrix relates the power values of the blocks 101-105 to differences between the temperatures at a plurality of different locations on the chip (locations other than the sensor locations) and the reference temperature $T_{ref}$. In this regard, FIG. 2 shows an example of a grid 200 overlaid on the chip in FIG. 1. In this example, the different locations on the chip correspond to different points on the grid, where each grid point lies on the intersection of a vertical line and horizontal line of the grid 200. The grid points provide evenly spaced locations across the chip.

In this example, the temperatures at the grid point locations are related to the power values of the blocks 111-115 as follows:

$$\begin{bmatrix} T_{g_1} \\ \vdots \\ T_{g_L} \end{bmatrix} = \begin{bmatrix} \Psi_{g11} & \cdots & \Psi_{g1N} \\ \vdots & \ddots & \vdots \\ \Psi_{gL1} & \cdots & \Psi_{LN} \end{bmatrix} \begin{bmatrix} P_1 \\ \vdots \\ P_N \end{bmatrix} + T_{ref} \quad \text{Eq. (6)}$$

where the left-most matrix is a temperature matrix comprising temperatures at the grid point locations, L is the number of grid points, the right-most matrix is the power matrix comprising the power values for the blocks 101-105 calculated in equation (5), the middle matrix is the second influence coefficient matrix discussed above, and $T_{ref}$ is the reference temperature. Each coefficient in the second influence coefficient matrix relates the power at a respective one of the blocks 101-105 to the change in temperature at a respective one of the grid points in response to the power at the respective block, where the change in temperature is with respect to the reference temperature $T_{ref}$. The second influence coefficient matrix may be generated by performing thermal simulations of the chip in a similar manner as the first influence coefficient matrix discussed above. In this regard, each column in the second influence coefficient matrix may be generated by setting the power of the respective block to a predetermined power value with the other blocks powered off, and determining the coefficients in the column based on the predetermined power value of the respective block and the resulting temperature changes at the grid point locations.

Equation (6) may be denoted as follows for simplicity:

$$[T_{grid}] = [\Psi_{grid}][P_{blocks}] + T_{ref} \qquad \text{Eq. (7)}$$

where $[T_{grid}]$ denotes the temperature matrix in equation (6), $[\Psi_{grid}]$ denotes the second influence coefficient matrix, and $[P_{blocks}]$ denotes the power matrix. As shown in equation (7), the temperature manager can calculate the temperatures at the grid point locations using the power values for the blocks calculated in equation (5).

Thus, the temperature manager can calculate the temperature values at the grid point locations using the temperature readings from the temperature sensors 11-115 by performing the following procedure:
1. Receive temperature readings from the temperature sensors 111-115;
2. Calculate power values for the blocks 101-105 using the received temperature readings and the inverse of the first influence coefficient matrix according to equation (5); and
3. Calculate the temperature values at the grid point locations using the calculated power values in step 2 and the second influence coefficient matrix according to equation (7).

After calculating the temperature values at the grid point locations, the temperature manager can estimate a hotspot temperature of the chip based on the calculated temperature values. For example, the temperature manager may use the largest one of the calculated temperature values (maximum calculated temperature value) as an estimate of the hotspot temperature. The accuracy of the estimated hotspot temperature may be increased by increasing the number of grid points and decreasing the spacing between adjacent grid points, which increases the resolution (granularity) at which the temperature manager can determine temperature across the chip.

In certain aspects, equation (7) can be rewritten by inputting the expression for the power matrix in equation (5) into equation (7) as follows:

$$[T_{grid}] = [\Psi_{grid}][\Psi_{sen}]^{-1}[\Delta T_{sen}] + T_{ref} \qquad \text{Eq. (8)}$$

In equation (8), the product of the second influence coefficient matrix and the inverse of the first influence coefficient matrix form a combined matrix $[\Psi_{grid}][\Psi_{sen}]^{-1}$. The combined matrix relates temperature changes at the sensor locations to temperature changes at the grid point locations, in which the temperature changes are with respect to the reference temperature $T_{ref}$. Since the temperature changes at the sensor locations can be determined from temperature readings from the temperature sensors 111-115, as discussed above, the temperature manager can use the combined matrix to convert temperature readings from the temperature sensors 111-115 into temperatures at the grid point locations. In this example, the temperature manager may store the combined matrix in a memory, in which the memory may be an internal memory of the temperature manager or an external memory coupled to the temperature manager.

It is to be appreciated that aspects of the present disclosure are not limited to determining temperature values at grid point locations. In general, the temperature manager may determine temperature values at a plurality of locations on the chip 100 (locations other than the locations of the temperature sensors). In this regard, each coefficient in the second influence coefficient matrix relates the power at a respective one of the blocks 101-105 to the change in temperature at a respective one of the locations on the chip 100 in response to the power at the respective block, where the change in temperature is with respect to the reference temperature $T_{ref}$. Each column in the second influence coefficient matrix may be generated by setting the power of the respective block to a predetermined power value with the other blocks powered off, and determining the coefficients in the column based on the predetermined power value of the respective block and the resulting temperature changes at the plurality of locations on the chip.

Thus, aspects of the present disclosure enable a temperature manager to calculate temperature values at many locations on a chip using temperature readings from a relatively small number of temperature sensors. The number of locations may greatly exceed the number of temperature sensors, enabling the temperature manager to estimate the temperature of a hotspot with significantly greater accuracy compared with using temperature readings alone, which only provide temperature values at the locations of the temperature sensors. Further, the locations at which the temperature manager can calculate temperature values are not constrained by the same restrictions placed on the locations of physical temperature sensors discussed above. This allows the temperature manager to calculate temperatures at locations within very active and densely populated regions of the chip where hotspots typically occur without negatively impacting chip performance.

Because aspects of the present disclosure enable the temperature manager to more accuracy estimate a hotspot temperature, the margin that needs to be built into the estimated hotspot temperature to account for differences between the estimated hotspot temperature and the actual hotspot temperature is reduced. The reduced margin allows one or more of the blocks 101-105 to operate at higher speed for a longer period of time before the temperature manager initiates temperature mitigation, thereby improving performance.

Figure 3:
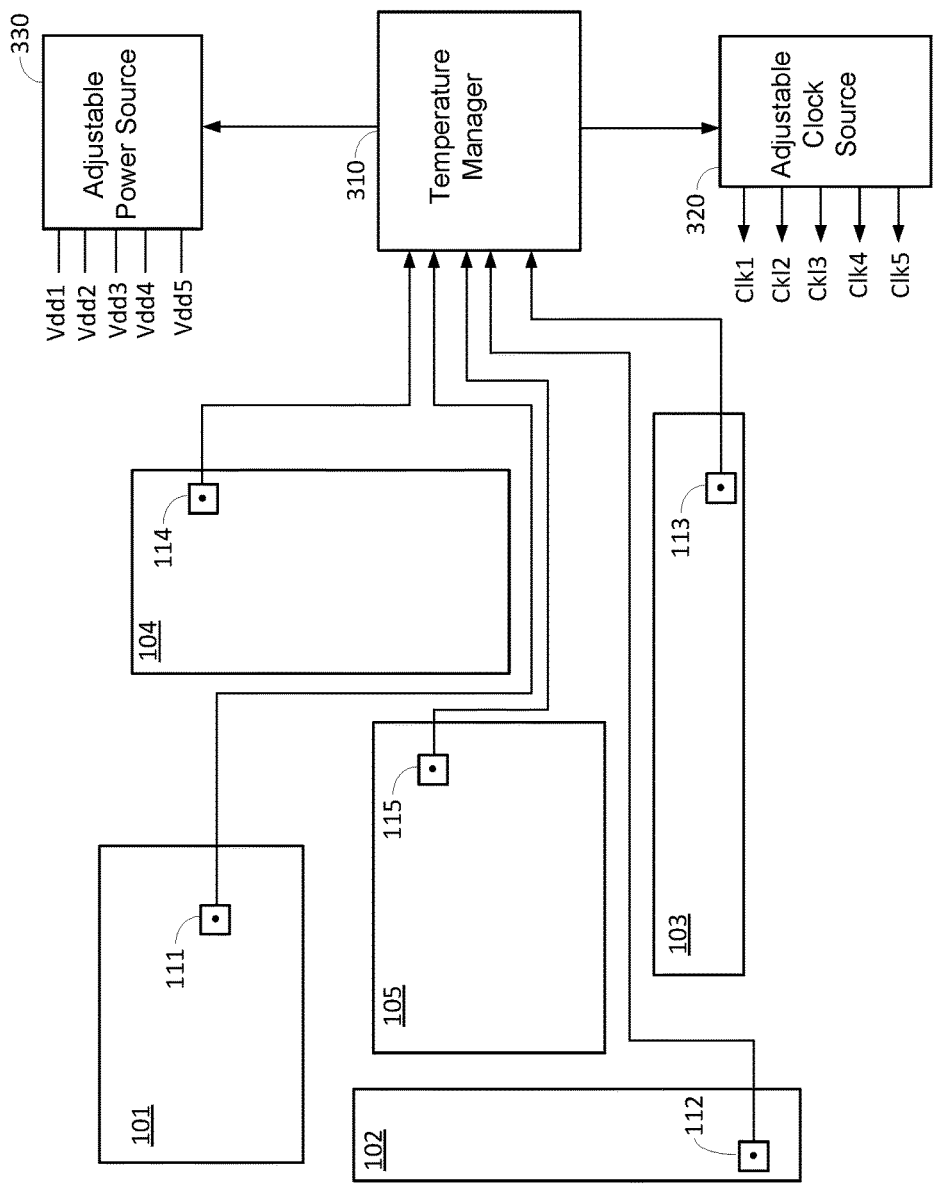
FIG. 3 shows an example of a temperature management system according to certain aspects of the present disclosure.

FIG. 3 shows an exemplary temperature management system configured to manage temperature for the blocks 101-105 (e.g., one or more CPUs, GPU, modem, etc.) according to certain aspects of the present disclosure. In this example, the temperature management system includes the temperature sensors 111-115 and a temperature manager 310. Each of the temperature sensors 111-115 is configured to measure temperature at its location, and send the corresponding temperature readings to the temperature manager 310, as discussed further below. The temperature management system also includes an adjustable clock source 320 and an adjustable power source 330. The temperature manager 310 and clock source 320 may be integrated on the same chip as the blocks 101-105, and the power source 330 may be an external power source (i.e., off-chip power source).

The adjustable clock source 320 is configured to generate a plurality of clock signals Clk1 to Clk5, where each clock signal may be input to a respective one of the blocks 101-105. For example, clock signal Clk1 may be input to block 101, clock signal Clk2 may be input to block 102, and so forth. For ease of illustration, the individual connections between the adjustable clock source 320 and the blocks 101-105 are not explicitly shown in FIG. 3. The adjustable block source 320 is also configured to adjust the frequency of each clock signal under the control of the temperature manager 310, as discussed further below. Each block 101-105 may use the respective clock signal for switching (toggling) transistors in the block. The adjustable clock source 320 may comprise one or more phase locked loops (PLLs), one or more delay locked loops (DLLs), etc. Thus, the temperature manager 310 can adjust (scale) the operating frequency of each block by adjusting the frequency of the respective clock signal output from the adjustable clock source 320.

The adjustable power source 330 is configured to provide adjustable supply voltages Vdd1 to Vdd5, where each supply voltage may be provided to a respective one of the blocks 101-105. For example, supply voltage Vdd1 may be provided to block 101, supply voltage Vdd2 may be provided to block 102, and so forth. For ease of illustration, the individual connections between the power source 330 and the blocks 101-105 are not explicitly shown in FIG. 3. The power source 330 is also configured to adjust the supply voltages Vdd1 to Vdd5 under the control of the temperature manager 310, as discussed further below. The power source 330 may comprise a power management integrated circuit (PMIC) or other type of circuit. Thus, the temperature manager 310 can adjust (scale) the supply voltages of the blocks by adjusting the supply voltages Vdd1 to Vdd5 provided from the power source 330.

In operation, the temperature manager 310 receives temperature readings from the temperature sensors 111-115. The temperature manager 310 may then calculate power values for the blocks 111-115 on the chip using the temperature readings and the inverse of the first influence coefficient matrix (e.g., according to equation (5)). The temperature manager may then calculate temperature values for a plurality of different locations on the chip (locations other than the locations of the temperature sensors) using the calculated power values and the second influence coefficient matrix (e.g., according to equation (7)). In certain aspects, the temperature manager 310 may perform the above operations using the combined matrix (the product of the second influence coefficient matrix and the inverse of the first influence coefficient matrix), as discussed above.

After determining the temperature values for the plurality of locations, the temperature manager 310 may estimate a hotspot temperature of the chip based on the determined temperature values. For example, the temperature manager 310 may use the largest one of the calculated temperature values (maximum calculated temperature value) as an estimate of the hotspot temperature. In another example, the temperature manager 310 may also determine temperature values at the sensor locations from the temperature readings. In this example, the temperature manager 310 may use the largest (maximum) temperature value from a set of temperature values as an estimate of the hotspot temperature, in which the set of temperature values includes the calculated temperature values and the temperature values at the sensor locations.

After estimating the hotspot temperature, the temperature manager 310 may compare the estimated hotspot temperature to a temperature threshold. If the estimated hotspot temperature exceeds the temperature threshold, then the temperature manager 310 may perform temperature mitigation, in which the temperature manager 310 takes action to reduce the hotspot temperature. For example, the temperature manager 310 may reduce the hotspot temperature by signaling the clock source 320 to reduce the frequency of one or more of the clock signals Clk1 to Clk5 and/or signaling the power source 330 to reduce one or more of the supply voltages Vdd1 to Vdd5.

In certain aspects, when an estimated hotspot temperature exceeds the temperature threshold, the temperature manager 310 may estimate the location of the hotspot on the chip. For the example in which the estimated hotspot temperate corresponds to the largest (maximum) calculated temperature value, the temperature manager may use the corresponding location on the chip as an estimate of the hotspot location. The temperature manager 310 may then perform temperature mitigation based on the estimated hotspot location.

For example, if the estimated hotspot location is within one of the blocks 101-105, then the temperature manager 310 may send a command to the clock source 320 to reduce the clock signal of the block and/or send a command to the power source 330 to reduce the supply voltage of the block. This reduces the hotspot temperature by reducing the dynamic power dissipation of the block. In another example, if the estimated hotspot location is between two or more of the blocks 101-105, then the temperature manager 310 may send a command to the clock source 320 to reduce the frequencies of the clock signals of the two or more blocks and/or send a command to the power source 330 to reduce the supply voltages of the two or more blocks.

It is to be appreciated that the temperature values for the plurality of locations on the chip may refer to the temperatures at the plurality of locations or to the differences between the temperatures at the plurality of locations and the reference temperature $T_{ref}$. In either case, the temperature threshold may correspond to a temperature value above which power leakage becomes excessive and/or thermal runaway is triggered.

Although the temperature manager 310 is able to independently control the clock signals and the supply voltages of the blocks 101-115 in the example shown in FIG. 3, it is to be appreciated that the present disclosure is not limited to this example. For example, two or more of the blocks may share a clock signal and/or a supply voltage. In this example, if an estimated hotspot temperature located in one of the two or more blocks exceeds the temperature threshold, then the temperature manager 310 may reduce the frequency of the clock signal and/or reduce the supply voltage shared by the two or more blocks.

Figure 4:
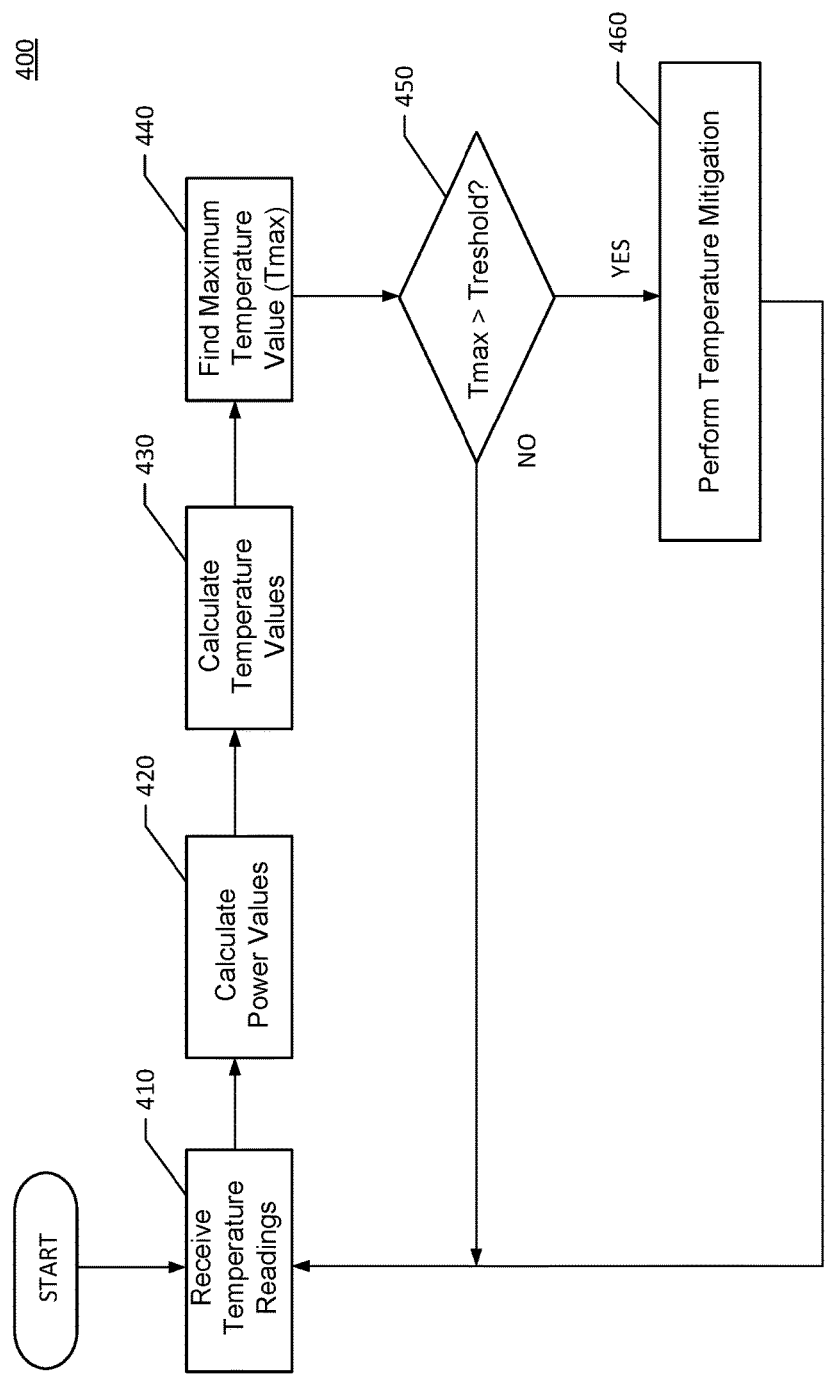
FIG. 4 is a flowchart illustrating exemplary operations of a temperature manager according to certain aspects of the present disclosure.

FIG. 4 is a flowchart illustrating exemplary operations of the temperature manager 310 according to certain aspects of the present disclosure.

In step 410, the temperature manager 310 receives temperature readings from the temperature sensors 111-115.

In step 420, the temperature manager 310 calculates power values for the blocks 101-105 on the chip. For example, the temperature manager 310 may calculate the power values for the blocks using the inverse of the first influence coefficient matrix and the received temperature readings (e.g., according to equation (5)).

In step 430, the temperature manager 310 calculates temperature values for a plurality of locations on the chip based on the calculated power values for the blocks. For example, the temperature manager 310 may calculate the temperature values using the second influence coefficient matrix and the calculated power values (e.g., according to equation (7)). In certain aspects, the temperature manager 310 may perform steps 420 and 430 using a combined matrix that is the product of the inverse of the first influence coefficient matrix and the second influence coefficient matrix (e.g., according to equation (8)).

In step 440, the temperature manager 310 finds the maximum temperature value (denoted "Tmax"). For example, the temperature manager 310 may use the maximum temperature value as an estimate of a hotspot temperature of the chip.

In step 450, the temperature manager 310 determines whether the maximum temperature value exceeds a temperature threshold. If the maximum temperature value does not exceed the temperature threshold, then the temperature manager 310 may return to step 410. If the maximum temperature value exceeds the temperature threshold, then the temperature manager 310 may proceed to step 460.

In step 460, the temperature manager 310 performs temperature mitigation. For example, the temperature manager 310 may perform temperature mitigation to reduce the hotspot temperature by sending a command to the clock source 320 to reduce the clock frequency for one or more of the blocks 101-105 and/or sending a command to the power source 330 to reduce the supply voltage for one or more of the blocks 101-105. After reducing the clock frequency and/or supply voltage, the temperature manager 310 may return to step 410. If the estimated hotspot continues to exceed the threshold, then the temperature manager 310 may further reduce the clock frequency and/or supply voltage by repeating step 460.

Figure 5:
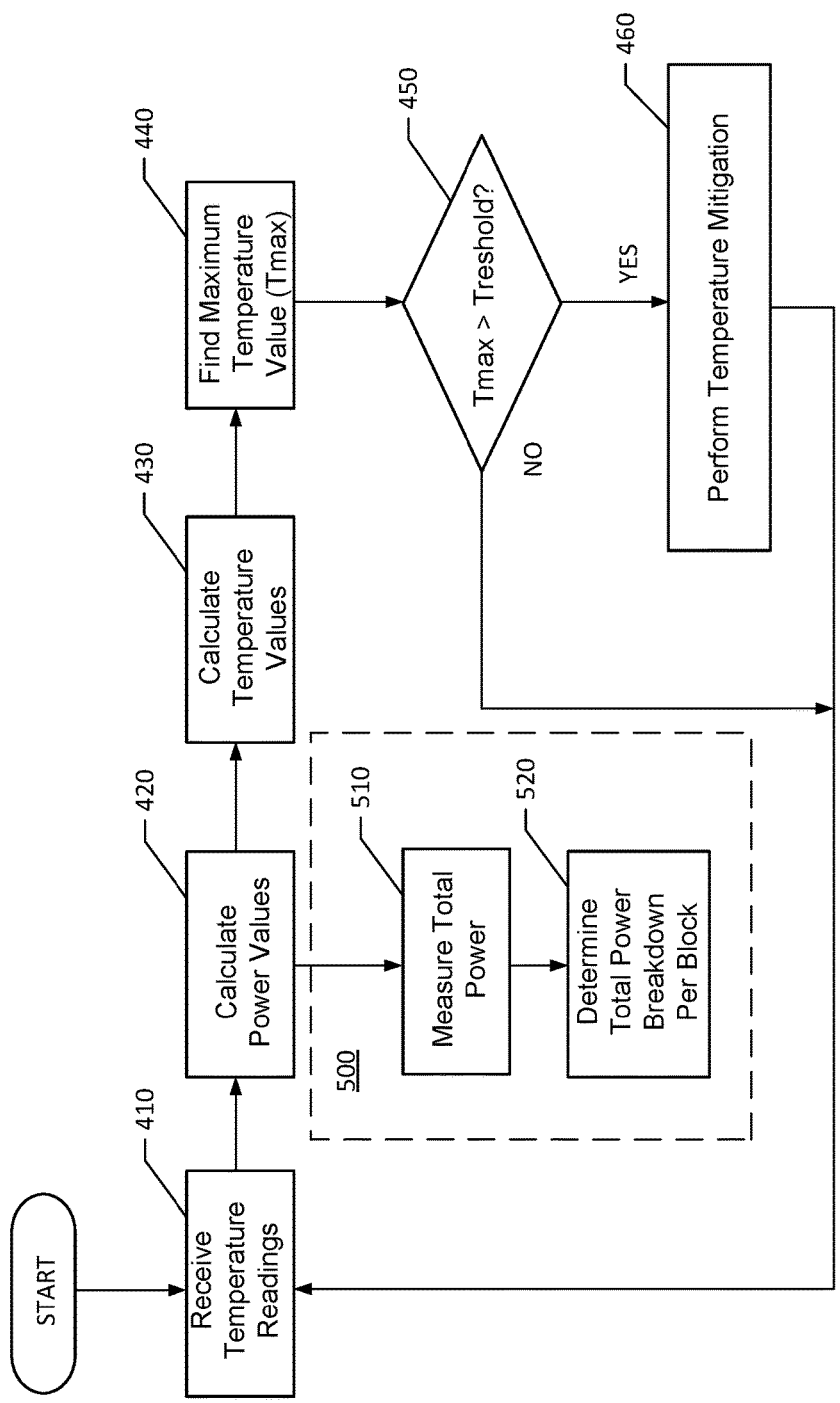
FIG. 5 is a flowchart illustrating exemplary operations for managing power according to certain aspects of the present disclosure.
Figure 6:
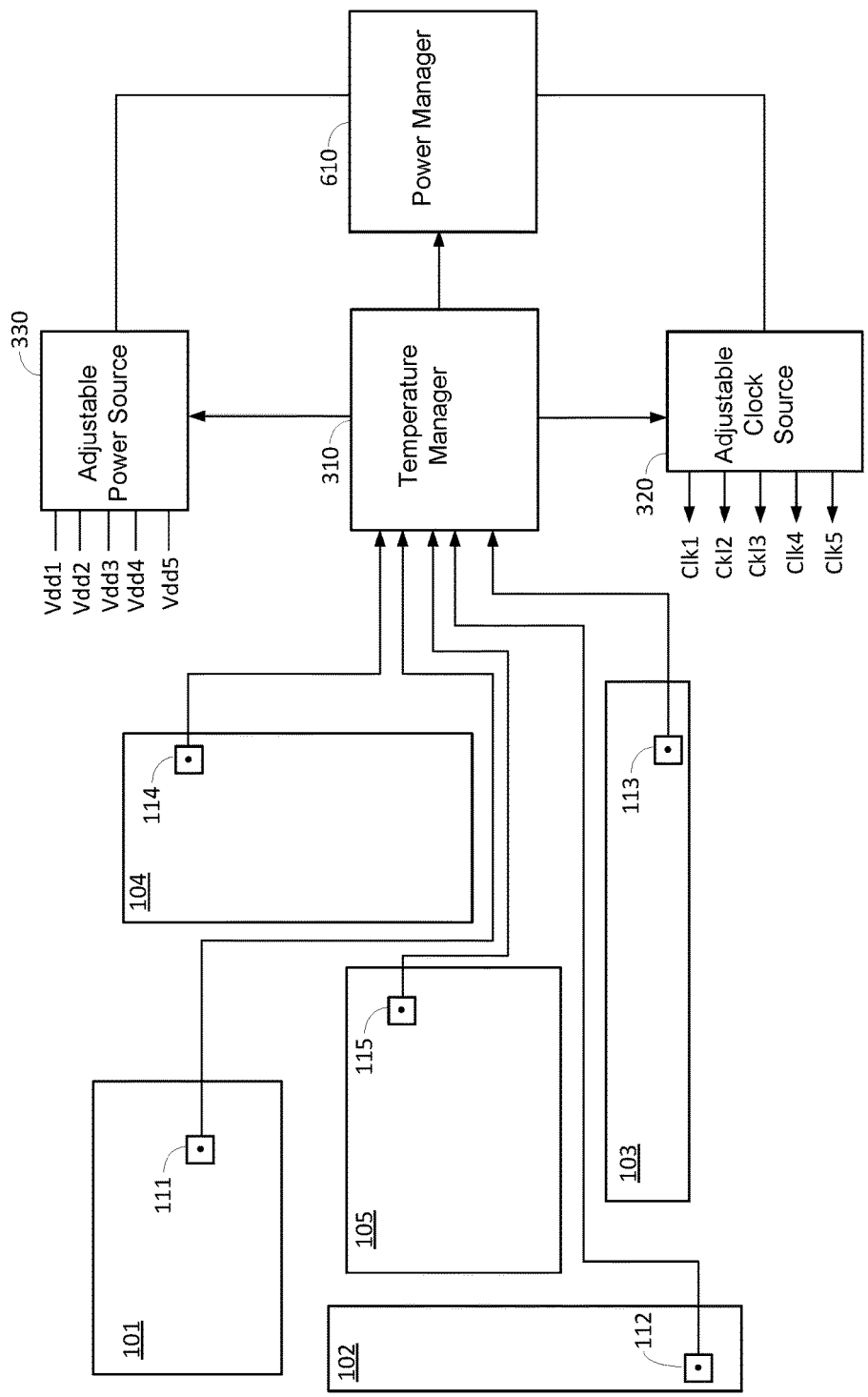
FIG. 6 shows an example of a power manager coupled to the temperature manager according to certain aspects of the present disclosure.

As discussed above, the temperature manager 310 calculates power values for the blocks 101-105 as an intermediate step. The calculated power values may be used for power management of the chip. In this regard, FIG. 5 illustrates exemplary operations 500 for power management using the power values calculated in step 420. The exemplary operations may be performed by a power manager 610 coupled to the temperature manager 310 and power source 330, as shown in FIG. 6.

Returning to FIG. 5, in step 510, the power manager 610 measures the total power output from the power source 330. In certain aspects, the total power output from the power source 330 may be provided by a battery (e.g., when the chip is included in a mobile device).

In step 520, the power manager 610 determines the total power breakdown per block 101-105. The power manager 610 may do this by performing the following steps. The power manager 610 may first determine total calculated power by summing the calculated power values from step 420. The total calculated power may be less than the total measured power since the total measured power includes power dissipation in the power distribution network between the power source 330 and the blocks 101-105. The power manager 610 may then determine a ratio of the total measured power over the total calculated power, and scale the calculated power for each block by the ratio to determine the total power breakdown per block. The total power breakdown per block provides the power manager 610 with information on the power distribution of the chip. The power manager 610 may use this information to manage power to the blocks 101-105.

For example, the power manager 610 may use the power consumption information to track days of usage (DoU) of a device (e.g., mobile device) incorporating the chip, in which the DoU is a metric for battery life/usage. In this example, a higher DoU signifies lower power consumption and hence more battery life. In another example, the power manager 610 may use the power consumption information to determine the amount of charge remaining in a battery powering the chip. If the remaining charge is low (e.g., below a threshold), then the power manager 610 may take steps to reduce power consumption such as powering off or reducing power for certain applications, blocks, features (e.g., reducing screen brightness), etc. Powering off a particular block may include decoupling the block from the battery, and reducing power for a particular block may include reducing the supply voltage and/or clock frequency of the block.

Figure 7A:
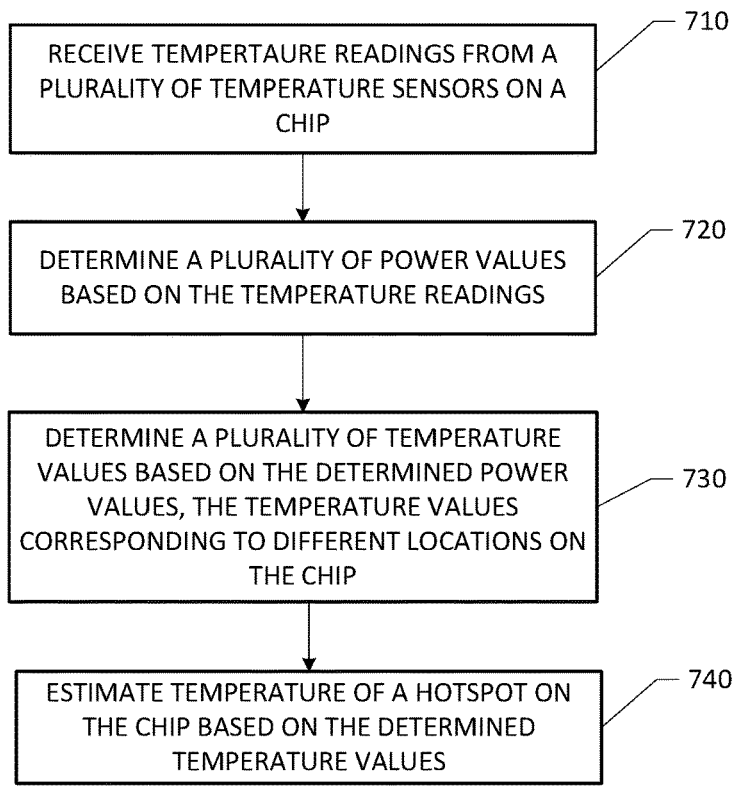
FIGS. 7A and 7B are flowcharts illustrating a method for managing temperature according to certain aspects of the present disclosure.

FIG. 7A is a flowchart illustrating a method 700 for managing temperature according to an embodiment of the present disclosure. The method 700 may be performed by the temperature manager 310.

In step 710, temperature readings are received from a plurality of temperature sensors on a chip. For example, each temperature sensor may be located in one of a plurality of blocks (e.g., blocks 101-105) on the chip.

In step 720, a plurality of power values are determined based on the temperature readings. For example, the power values may be determined using an inverse of a first influence coefficient matrix comprising a first plurality of coefficients, where each of the first plurality of coefficients relates power at a respective one of the blocks on the chip to a temperature change at a respective one of the temperature sensors.

In step 730, a plurality of temperature values are determined based on the determined power values, the determined temperature values corresponding to a plurality of different locations on the chip. For example, the temperature values may be determined using a second influence coefficient matrix comprising a second plurality of coefficients, where each of the second plurality of coefficients relates power at a respective one of the blocks on the chip to a temperature change at a respective one of the locations on the chip. In certain aspects, steps 720 and 730 may be performed using a combined matrix (product of the second influence coefficient matrix and the inverse of the first influence coefficient matrix), as discussed above.

In step 740, a temperature of a hotspot on the chip is estimated based on the determined temperature values. For example, the temperature of the hotspot may be estimated by determining a largest one of the temperature values.

Figure 7B:
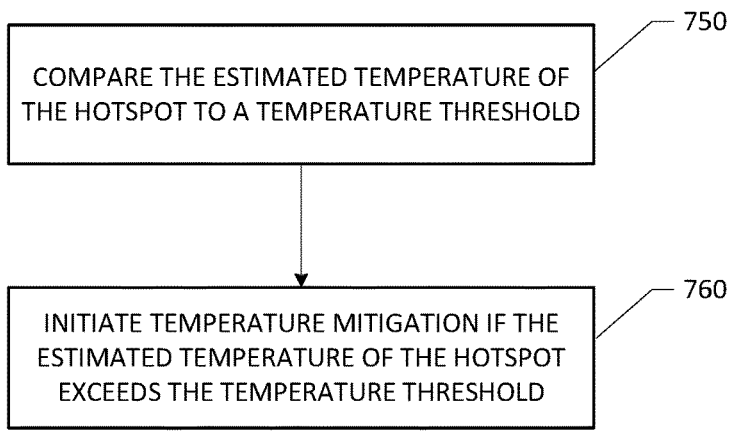

FIG. 7B is a flowchart illustrating additional optional steps that may be performed in the method 700 for managing temperature according to certain aspects. In optional step 750, the estimated temperature of the hotspot is compared to a temperature threshold. In optional step 760, temperature mitigation is initiated if the estimated temperature of the hotspot exceeds the temperature threshold. The temperature mitigation may involve reducing the frequency of a clock signal, reducing a supply voltage, or both.

The temperature manager and power manager according to any of the embodiments discussed above may be implemented with a general-purpose processor, a digital signal processor (DSP), an application specific integrated circuit (ASIC), a field programmable gate array (FPGA) or other programmable logic device, discrete hardware components, or any combination thereof designed to perform the functions described herein. A general-purpose processor may be a microprocessor, but in the alternative, the processor may be any conventional processor, controller, microcontroller, or state machine. A processor may perform the functions described herein by executing software comprising code for performing the functions. The software may be stored on a computer-readable storage medium, such as a RAM, a ROM, an EEPROM, an optical disk, and/or a magnetic disk.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A temperature management system, comprising:
a plurality of temperature sensors on a chip; and
a temperature manager configured to receive a plurality of temperature readings from the temperature sensors, to determine a plurality of power values based on the temperature readings, to determine a plurality of temperature values based on the determined power values, the determined temperature values corresponding to a plurality of different locations on the chip, and to estimate a temperature of a hotspot on the chip based on the determined temperature values;
wherein the temperature manager is configured to determine the power values using influence coefficients relating the power values to temperature changes at the temperature sensors.

2. The system of claim 1, wherein the temperature manager is configured to estimate the temperature of the hotspot based on a largest one of the determined temperature values.

3. The system of claim 2, wherein the temperature manager is configured to estimate a location of the hotspot based on the location corresponding to the largest one of the determined temperature values.

4. The system of claim 1, wherein each of the power values corresponds to power at a respective one of a plurality of blocks on the chip.

5. The system of claim 4, wherein the blocks include one or more processors.

6. The system of claim 1, wherein the temperature manager is configured to determine the temperature values using influence coefficients relating the power values to temperature changes at the different locations on the chip.

7. The system of claim 1, wherein the temperature manager is configured to compare the estimated temperature of the hotspot to a temperature threshold, and to initiate temperature mitigation if the estimated temperature of the hotspot exceeds the temperature threshold.

8. The system of claim 7, wherein the temperature manager is configured to initiate temperature mitigation by commanding a clock source to reduce a frequency of a clock signal, commanding a power source to reduce a supply voltage, or both.

9. A method for managing temperature, comprising:
receiving temperature readings from a plurality of temperature sensors on a chip;
determining a plurality of power values based on the temperature readings;
determining a plurality of temperature values based on the determined power values, the determined temperature values corresponding to a plurality of different locations on the chip; and
estimating a temperature of a hotspot on the chip based on the determined temperature values; wherein determining the power values comprises determining the power values using influence coefficients relating the power values to temperature changes at the temperature sensors.

10. The method of claim 9, wherein estimating the temperature of the hotspot comprises determining a largest one of the determined temperature values.

11. The method of claim 10, further comprising estimating a location of the hotspot based on the location corresponding to the largest one of the determined temperature values.

12. The method of claim 9, wherein each of the power values corresponds to power at a respective one of a plurality of blocks on the chip.

13. The method of claim 12, wherein the blocks include one or more processors.

14. The method of claim 9, wherein determining the temperature values comprises determining the temperature values using influence coefficients relating the power values to temperature changes at the different locations on the chip.

15. The method of claim 9, further comprising:
comparing the estimated temperature of the hotspot to a temperature threshold;
initiating temperature mitigation if the estimated temperature of the hotspot exceeds the temperature threshold.

16. The method of claim 15, wherein initiating temperature mitigation comprises commanding a clock source to reduce a frequency of a clock signal, commanding a power source to reduce a supply voltage, or both.

17. An apparatus for managing temperature, comprising:
means for receiving temperature readings from a plurality of temperature sensors on a chip;
means for determining a plurality of power values based on the temperature readings;
means for determining a plurality of temperature values based on the determined power values, the determined temperature values corresponding to a plurality of different locations on the chip; and
means for estimating a temperature of a hotspot on the chip based on the determined temperature values;
wherein the means for determining the power values comprises means for determining the power values using influence coefficients relating the power values to temperature changes at the temperature sensors.

18. The apparatus of claim 17, wherein the means for estimating the temperature of the hotspot comprises means for determining a largest one of the determined temperature values.

19. The apparatus of claim 18, further comprising means for estimating a location of the hotspot based on the location corresponding to the largest one of the determined temperature values.

20. The apparatus of claim 17, wherein each of the power values corresponds to power at a respective one of a plurality of blocks on the chip.

21. The apparatus of claim 20, wherein the blocks include one or more processors.

22. The apparatus of claim 17, wherein the means for determining the temperature values comprises means for determining the temperature values using influence coefficients relating the power values to temperature changes at the different locations on the chip.

23. The apparatus of claim 17, further comprising:
means for comparing the estimated temperature of the hotspot to a temperature threshold;
means for initiating temperature mitigation if the estimated temperature of the hotspot exceeds the temperature threshold.

24. The apparatus of claim 23, wherein the means for initiating temperature mitigation comprises means for commanding a clock source to reduce a frequency of a clock signal, means for commanding a power source to reduce a supply voltage, or both.

* * * * *